United States Patent [19]

Müller et al.

[11] Patent Number: 5,188,440
[45] Date of Patent: Feb. 23, 1993

[54] CONTROL STAGE FOR ACTUATION OF RECIRCULATING PUMP UNIT DRIVE MOTOR OF AN ANTILOCK BRAKING SYSTEM (ABS)

[75] Inventors: Armin Müller, Backnang; Richard Zimmer, Fellbach; Andreas Faulhaber, Weinstadt, all of Fed. Rep. of Germany

[73] Assignee: Mercedes-Benz AG, Fed. Rep. of Germany

[21] Appl. No.: 729,538

[22] Filed: Jul. 15, 1991

[30] Foreign Application Priority Data

Jul. 13, 1990 [DE] Fed. Rep. of Germany ....... 4022407

[51] Int. Cl.$^5$ ............................................. B60T 13/20
[52] U.S. Cl. ................................. 303/116.2; 303/10; 303/116.1
[58] Field of Search ................. 303/10, 11, 87, 113 R, 303/115 R, 115 EC, 116 R, 116 SP, 116 PC

[56] References Cited

U.S. PATENT DOCUMENTS

| 3,827,758 | 8/1974 | Hansen | 303/10 X |
| 3,887,238 | 6/1975 | Bennett | 303/10 X |
| 4,025,124 | 4/1977 | Fuchs | 303/116 PC X |
| 4,428,624 | 1/1984 | Farr | 303/116 R |
| 4,687,260 | 8/1987 | Matsui et al. | 303/116 R |
| 4,826,255 | 5/1989 | Volz | 303/116 R X |
| 4,892,364 | 1/1990 | Burgdorf | 303/116 R |
| 5,000,525 | 3/1991 | Reinartz et al. | 303/116 R |
| 5,033,800 | 7/1991 | Willmann | 303/116 R X |

FOREIGN PATENT DOCUMENTS

| 0313292 | 4/1989 | European Pat. Off. |
| 3404135 | 8/1985 | Fed. Rep. of Germany |
| 3731602 | 5/1988 | Fed. Rep. of Germany |
| 3813172 | 11/1989 | Fed. Rep. of Germany |
| 3813174 | 11/1989 | Fed. Rep. of Germany |
| 3818260 | 12/1989 | Fed. Rep. of Germany |
| 2197402 | 5/1988 | United Kingdom |
| 2219056 | 11/1989 | United Kingdom |

*Primary Examiner*—Robert J. Oberleitner
*Assistant Examiner*—Alfred Muratori
*Attorney, Agent, or Firm*—Evenson, Wands, Edwards, Lenhan & McKeown

[57] ABSTRACT

In an antilock braking system (ABS) operating on the recirculating principle with a static brake circuit and a tandem master cylinder as the brake booster, a control stage is provided in order to lessen the intensity of reaction shocks noticeable at the brake pedal when the antilock control commences. From the onset of a pressure reduction signal, the control stage generates, for at least one brake-pressure control valve of the ABS, an operating voltage for the drive motor of the recirculating pump unit which rises with increasing duration of this signal. After a predetermined rising time, the voltage can reach a maximum value, correlated with maximum speed of the motor, and then is held at this value at least until dying-out, or otherwise rises to that value which is reached within the pressure-reduction signal duration. At the dropping of the pressure reduction signal, the control stage effects a constant or stepwise reduction in the operating voltage of the motor until the motor is at a standstill, such that the time integral of the operating voltage over its reduction is greater than the time integral over the rising time of the operating voltage of the drive motor of the recirculating pump unit.

11 Claims, 2 Drawing Sheets

CONTROL STAGE FOR ACTUATION OF RECIRCULATING PUMP UNIT DRIVE MOTOR OF AN ANTILOCK BRAKING SYSTEM (ABS)

BACKGROUND AND SUMMARY OF THE INVENTION

The present invention relates to a control stage for the drive motor of a recirculating pump unit of an antilock braking system (ABS). More particularly, the invention relates to a control stage in an ABS, operating on the recirculating principle, according to which brake fluid which is drained out during a pressure reduction phase at a wheel brake subjected to automatic control via a brake-pressure control valve, which is controlled by a pressure reduction signal of the electronic ABS control unit into its pressure reduction position, and a return line into a low-pressure accumulator, is pumped back by the recirculating pump or pumps into the main brake line of the respective brake circuit. As a result, a quantity of brake fluid corresponding to the drained quantity is recirculated into the brake booster, the pump drive being activated for at least the duration of the pressure reduction phase, and the drive motor being configured as an electric motor whose speed is proportional to the operating voltage.

The ABS, which is standard on the majority of Mercedes-Benz passenger cars, operates on the recirculation principle. According to that principle, brake fluid is drained out, during a pressure reduction phase, from a wheel brake subjected to automatic control and passes via a brake-pressure control valve, which is controlled by a pressure reduction signal of the electronic ABS control unit, into its pressure reduction position. The drained brake fluid then passes via a return line of the brake circuit to which the wheel brake subjected to automatic control belongs, into a low-pressure accumulator, from which the drained brake fluid is then pumped back by the recirculating pump assigned to the brake circuit in question into the main brake line of the brake circuit. As a consequence, brake fluid is also recirculated out of the main brake line into the brake booster outlet pressure space assigned to the brake circuit, as a rule of a tandem master cylinder. As a result, the brake pedal is pushed back in the direction of its basic position, and the driver notices this as a return indication of the ABS activation.

The recirculating pumps, each assigned individually to the two brake circuits, i.e. a front-axle brake circuit and a rear-axle brake circuit, and usually configured as free-piston pumps, have a common eccentric drive, which is driven by an electric motor. In the case of the standard ABS, this drive motor is driven at full power, i.e. at is full operating voltage and maximum speed, from the beginning of a pressure reduction phase introducing an antilock control cycle, so that the recirculating pumps are also operated at their maximum delivery from the beginning of the pressure reduction phase.

Consequently, when the ABS responds, even though only relatively slight brake pressure reductions, in absolute terms, at the vehicle wheels subjected to automatic control are necessary, a disproportionately vigorous, shock-like reaction on the brake pedal occurs, and this reaction is felt by drivers experiencing normal comfort to be troublesome at the least, and often even alarming.

This disadvantage can be avoided if the ABS is designed in such a way that it operates in the range of low amounts of necessary pressure reductions on the principle of pressure modulation by expansion of a modulation chamber and only in the range of higher amounts of necessary pressure reductions on a modified recirculation principle, in which the pressure modulator also assumes the function of a recirculating pump, so that a return indication of the activation of the ABS, noticeable at the brake pedal, takes place only in very much rarer cases and also less "violently", but realizing an ABS in such a way involves a considerably constructional outlay with regard to the design of the hydraulic unit and is very much more expensive than the hydraulic unit of the conventional ABS.

Another known antilock braking system, in which the problem of the pedal reaction when there is a response of the automatic control is less serious than in the case of an antilock braking system operating on the recirculation principle, is shown in DE 37 31 603 Al. This system operates on the principle of brake pressure reduction by draining brake fluid out from the wheel brake cylinder of one or more of the wheel brakes subjected to automatic control into the reservoir, and controls brake pressure restoring phases by at least one electrically driven pump which pumps brake fluid out of the reservoir into the wheel brake. During an activation of the automatic control, a quantity of brake fluid is pumped, also by the pump, into the master cylinder of the brake system such that its piston or pistons and, with it or them, respectively, the brake pedal assume a specified position provided for automatic control and corresponding to an intermediate position between their possible external positions. This setting of the specified position is necessary in order to exclude the possibility under extreme control conditions of a no-load controlling of the master cylinder, associated with which would be a failure of the brake system at the end of such a controlling operation.

In order to ensure as pleasant as possible a pedal feeling during the setting of the specified position of the master cylinder pistons and of a brake pedal provided for automatic control, and in order for operator convenience not to be adversely affected, it is also possible, as shown in DE 38 18 260 Al, for the speed of the pump to be controlled appropriately according to requirements on the basis of a "volume model". According to this model, the pump comes in at high speed if a considerable quantity of brake fluid has to be pumped into the master cylinder until the specified position of the brake pedal is reached, and at a lower speed if actual position and specified position of the brake pedal are only slightly different.

A significant disadvantage of such a known antilock braking system operating in control mode with a opening of the brake circuits to the reservoir is, however, as also know in combination with such a system shown in DE 38 13 172 Al, the considerable technical expenditure required for the functional monitoring of the pump. This monitoring is necessary for reasons of safety. Although it is possible to make use of sensors which are also employed for controlling the pump speed, such as wheel speed sensors, piston position sensors and/or pressure sensors, in the case of such an ABS at least the outlet valves assigned to the wheel brakes which can be subjected to automatic control must also be able to be checked for their serviceability This requires an additional expenditure in order to achieve an overall functional reliability comparable with the functional reliability of a brake system equipped with an antilock braking system operating on the recirculation principle, i.e. constantly with closed brake circuits An object of the present invention is, therefore, to improve the standard ABS or a functionally equivalent ABS, with low outlays such that the return indication characteristic of a response of the ABS noticeable at the brake pedal is lessened considerably in its intensity while nevertheless remaining adequately perceptible.

This object has been achieved by a control stage according to the present invention in which, from the onset of a pressure reduction signal, the control stage generates an operating voltage for the drive motor which rises with increasing duration of this signal and, after a predetermined rising time, can reach a maximum value correlated with maximum speed of the motor. The voltage then is held at this value at least until the pressure reduction signal dies out, or otherwise rises up to that value which is reached within the pressure-reduction signal duration. The control stage controls a reduction, either constant or stepwise, of the operating voltage of the motor, commencing upon the dropping of the pressure reduction signal, until the standstill of the motor, that the time integral of the operating voltage over the reduction of the operating voltage corresponds at least to the time integral over the rising time of the operating voltage.

The type of actuation of the drive motor of the recirculating pumps provide according to the present invention has the effect that, in cases in which the brake pressure has to be lowered only by a relatively small amount and consequently pressure reduction signals of relatively short duration are generated, the speed of the drive motor of the recirculating pump is kept low. Consequently, the recirculation of the brake fluid into the brake line or lines takes place correspondingly slowly and the pedal reaction is accordingly also gentle. The return-indication movements of the brake pedal proceed as it were in a smoothed "ramp shaped" manner and not in an abruptly step-shaped manner which produces a much less disturbing pedal feeling when there is a response from the automatic control.

The control stage according to the present invention is also less expensive to implement since only additional electronic components which can be readily integrated into the circuitry of the electronic control unit of the ABS are required. Therefore, the control stage adds only a little, if at all, to the overall price of the ABS, which appears to be highly justified by the gain in comfort.

Due to the condition that the time integral of the operating voltage over its reduction phase is to be at least equal to the time integral of the recirculating-pump drive motor over its rising phase, it is also adequately ensured that the buffer/accumulators, which can receive brake fluid in pressure reduction phases of antilock control, is or are substantially pumped empty at the end of a pressure reduction phase and therefore able to receive inflowing brake fluid once again.

At least one digital/analog converter is provided for generating the operating voltage fed to the drive motor of the recirculating pumps which convert the output counter reading of a forward/backward counter into a voltage proportional thereto. During the duration of the pressure reduction signal, this forward/backward counter is fed at its plus counting input upward-counting pulses generated at a fixed clock rate. After dying-out of the pressure reduction signal, the minus counting input of the counter is fed continuously generated backward-counting pulses, which are suppressed for the duration of the pressure reduction signal. The repetition frequency of the backward-counting pulses is, at most, equal to that of the upward-counting pulses. This provides a way of realizing the basic configuration of the control stage according to the invention.

Digital-electronics can be integrated in a simple way into the electronic control unit of the ABS in accordance with the present invention. At least one AND logic element is provided for generating the upward-counting pulses, which element receives at one of two inputs the pressure reduction signal and at the other input high-frequency output pulses of a clock pulse generator. At least one AND logic element is provided for generating the backward-counting pulses, which element has at least one negated input, at which it receives the output signal of the respective AND element, as well as a non-negated input, at which it receives the output pulses of the clock pulse generator.

Other features of the present invention provide a control stage which is appropriately configured for a vehicle with front-axle/rear-axle brake circuit division and separate brake pressure control at the front-wheel brakes and joint brake-pressure control at the rear-wheel brakes.

The rise of the operating voltage and the reduction of the operating voltage can take place time-linearly, and the duration of the voltage reduction can be greater that the duration of the rise of the operating voltage of the drive motor to provide the basic measure by which additional certainly can be achieved that low-pressure accumulators provided for receiving brake fluid drained off in pressure reduction phases of antilock control are completely pumped empty at the end of a pressure reduction phase and consequently are receptive again with their full capacity for a subsequent reduction phase.

This measure can be realized in a simple way by the frequency of the backward-counting pulses fed to the minus counting input of the forward-backward counter being lower than that of the upward counting pulses and, in combination with the above-mentioned digital-electronics, of realizing the control stage according to the invention, in which the minus counting input of the forward/backward counter is preceded by a dividing stage.

With alternative features, including in combination with those features mentioned above in this respect, it can be ensured that buffer accumulators provided for receiving brake fluid are completely pumped empty after the pressure reduction phases have elapsed, it also being possible to utilize these possibilities. For instance, the signal, with is available as a direct-voltage signal for at least the duration of the pressure reduction phases and is fed to an input of the AND element, respectively, emitting the upward-counting pulses, is generated as a signal which commences with the pressure reduction signal but is drop-delayed with respect to the latter. Furthermore, at the beginning of braking, a supply voltage signal bringing about a brief activation of the recirculating pump drive motor is generated.

BRIEF DESCRIPTION OF THE DRAWINGS

These and further objects, features and advantages of the present invention will become more apparent from the following detailed description of a presently preferred embodiment when taken in conjunction with the accompanying drawing wherein.

DETAILED DESCRIPTION OF THE DRAWINGS

Figure 1:
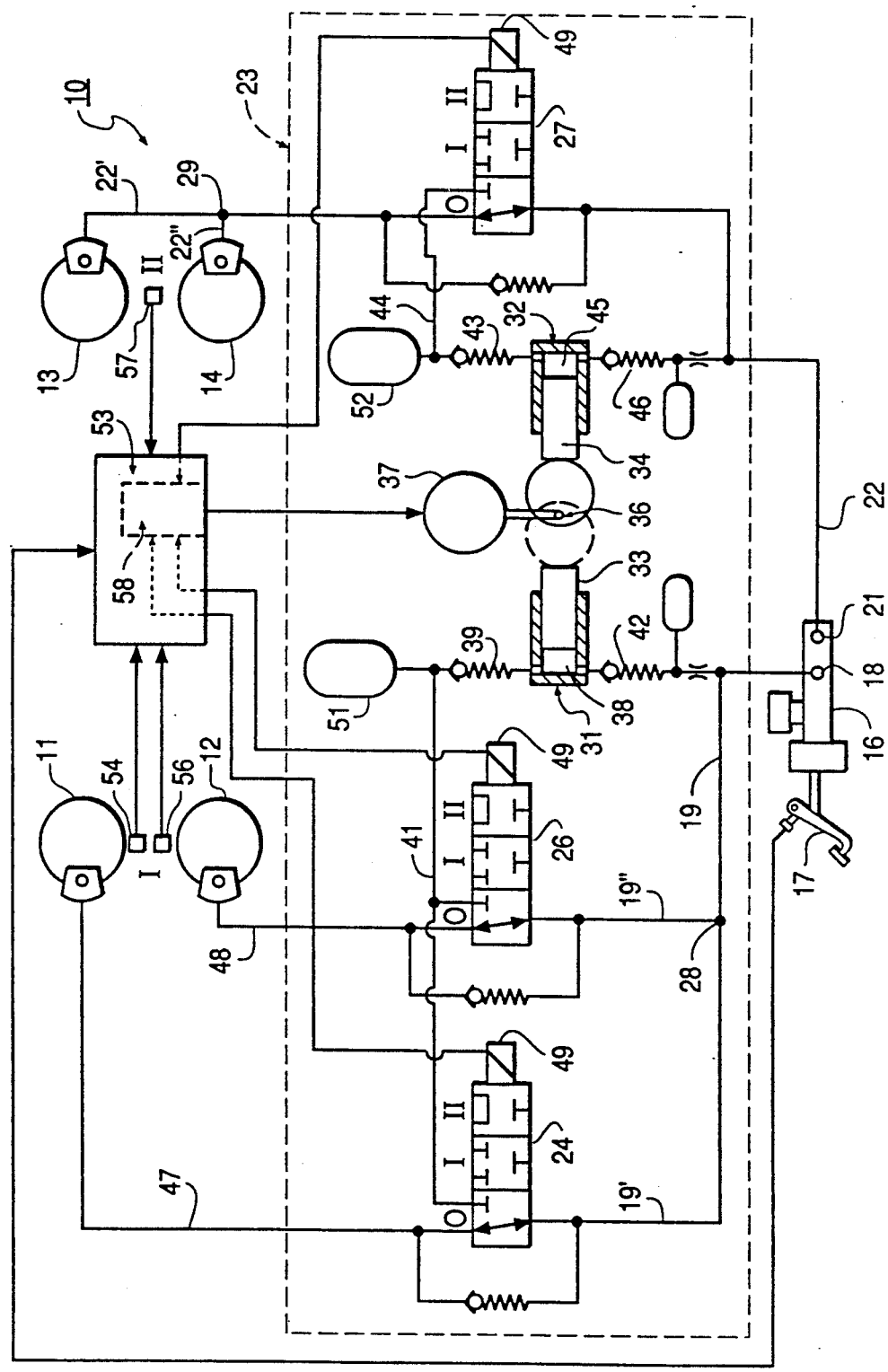
FIG. 1 shows an electro-hydraulic circuit schematic of a known ABS operating on the recirculation principle for a road vehicle, in order to explain the problem solved by the present invention.

In FIG. 1, a road vehicle hydraulic dual-circuit brake system is designated generally by numeral 10. The front-wheel brakes 11 and 12 of the system are combined in a front-axle brake circuit I and the rear-wheel brakes 13 and 14 of the system are combined in a rear-axle brake circuit II. A brake booster 16, which is provide for actuating the brake system 10 and can be actuated by a brake pedal 17, is disclosed as a static tandem master cylinder, at whose primary pressure outlet 18 of main brake line 19 of the front-axle brake circuit I is connected and at whose secondary pressure outlet 21 the main brake line 22 of the rear-axle brake circuit II is connected.

The vehicle is equipped with an antilock braking system (ABS), designated generally by numeral 23, which operates on the front-axle brake circuit I with individual brake pressure control at the front-wheel brakes 11 and 12 and on the rear-axle brake circuit II with joint brake pressure control on the select-low principle at the rear wheel brakes 13 and 14.

The ABS 23 accordingly comprises brake-pressure control valves 24, 26, each assigned individually to the right front-wheel brake 11 and the left front-wheel brake 12, and a brake-pressure control valve 27, assigned commonly to the two rear-wheel brakes 13, 14, via which brake-pressure build-up, brake-pressure hold and brake-pressure reduction phases can be controlled individually at the front-wheel brakes 11 and 12, and jointly at the rear wheel brakes 13 and 14.

The two brake-pressure control valves 24, 26 are each individually connected between the branching point 28, from which the brake line branches 19' and 19'' leading to the two front-wheel brakes 11 and 12 emerge and the respective front-wheel brakes 11, 12, whereas the brake-pressure control valve 27 of the rear-axle brake circuit II is connected between the brake-booster pressure outlet 21 assigned to the rear-axle brake circuit II and the branching point 29 from which the brake line branches 22' and 22'' leading on to the two rear-wheel brakes 13, 14 emerge.

The ABS 23 operates on the recirculation principle, according to which, in brake-pressure reduction phases of the antilock control, a quantity of brake fluid is pumped out of a wheel brake 11 and/or 12, subjected to automatic control, of the front-axle brake circuit I or 13 wheel brake and/or 14 of the rear-axle brake circuit II, which quantity consequently corresponds to the respectively drained quantity of brake fluid, by a recirculating pump 31 or 32, assigned to the front-axle brake circuit I and the rear-axle brake circuit II. The pumped quantity is pumped into the main brake line 19 of the front-axle brake circuit I and the main brake line 22 of the rear-axle brake circuit II, respectively, into the outlet pressure spaces of the brake booster 16, provided for the front-axle brake circuit I and the rear-axle brake circuit II, respectively.

The two recirculating pumps 31, 32 are configured as free-piston pumps, which have a common eccentric drive, acting on their pistons 33, 34, respectively, which is designated generally by numeral by 36 and an electric drive motor 37.

The pump chamber 38 of the recirculating pump 31 assigned to the front-axle brake circuit I is connected via an inlet check valve 39 to a return line 41 of the front-axle brake circuit I and via an outlet check valve 42 to the main brake line 19 of the front-axle brake circuit I.

The pump chamber 45 of the recirculating pump 32 assigned to the rear-axle brake circuit II is likewise connected via an inlet check valve 43 to a return line 44 of the rear-axle brake circuit II and via an outlet check valve 46 to the main brake line 22 of the rear-axle brake circuit II.

The brake-pressure control valves 24, 26, each individually assigned to the front-wheel brakes 11, and 12, and the brake-pressure control valve 27, jointly assigned to the rear-wheel brakes 13 and 14, are 3/3-way solenoid valves whose basic position 0 is a through-flow position, in which the brake line branches 47, 48, leading on to the front-wheel brakes 11, 12, and the brake line branches 22', 22'', leading to the rear-wheel brakes 13 and 14, are connected to the main brake line 19 of the front-axle circuit I and the main brake line 22 of the rear-axle brake circuit II, respectively, but are blocked off from the return lines 41, 44, respectively. This basic position 0 is assigned to the normal braking mode, i.e. not subjected to brake pressure control, as well as to brake-pressure restoring phases of the antilock control. By actuating their control solenoids 49 with a defined, relatively low current intensity of, for example, 3A, these brake-pressure control valves 24, 26 and 27 can be switched individually or jointly into a first excited position I (the brake-pressure hold position) in which the wheel brakes 11 and/or 12 or 13 and 14 are blocked off both from the main brake line 19 and the return line 41 of the front-axle brake circuit I or the main brake line 22 and the return line 44 of the rear-axle brake circuit II, respectively. By exciting the control solenoids 49 with a control signal of defined, higher current intensity of, for example, 6A, the brake pressure control valves 24 and 26 or 27 can be controlled individually or jointly into a second excited position II (the brake-pressure reduction position) in which the front-wheel brakes 11, 12 are connected individually or jointly to the return line 41 of the front-axle brake circuit I and are blocked off from the main brake line 19 of the latter or the rear-wheel brakes 13 and 14 are connected jointly to the return line 44 of the rear-axle brake circuit II and are blocked off from the main brake line 22 of the latter.

Connected to the return lines 41, 44 of the respective front-axle brake circuit I and the rear-axle brake circuit II, there is a respective low-pressure accumulator 51, 52 whose receiving capacity corresponds approximately to half that of the brake fluid volume which is forced under the highest-possible values of the brake pressure into the wheel brakes 11 and 12 of the front-axle brake circuit I and the brake line branches 47 and 48, connected to the latter brakes, or into the wheel brake lines 22' and 22'', connected to the rear-wheel brakes 13 and 14. In keeping with the configuration of the front-wheel brakes 11, 12 and the rear-wheel brakes, the receiving capacity of the low-pressure accumulator 51 of the front-axle brake circuit I is approximately twice the receiving capacity of the low-pressure accumulator 52 of the rear-axle brake circuit II. The low-pressure accumulators 51, 52 act as buffer accumulators, which can receive brake fluid drained off from wheel brake 11 and/or 12 or 13 and 14, subjected to automatic control, very quickly in the quantity necessary for a rapid brake pressure reduction, before this brake fluid is then pumped back by the respective recirculating pump 31 and/or 32 into the main brake line 19 or 22 of the front-axle brake circuit I and/or of the rear-axle brake circuit II and consequently to the brake booster 16. The delivery volume of the recirculating pumps 31 and 32 per piston stroke is about 1/20 to 1/10 of the receiving capacity of the low-pressure accumulator 51 and the low-pressure accumulator 52, respectively.

The signals required for the appropriately controlled actuation of the brake-pressure control valves 24, 26 and 27 as well as the pump drive motor 37 are generated by an electronic control unit 53 by a processing, performed on the basis of known criteria, of the output signals of wheel speed sensors 54, 56 and 57, the output signals of which, by level and/or frequency, contain the information on the dynamic behavior of the vehicle wheels.

As explained up to this point, the ABS 23 corresponds to the ABS today fitted as standard in the case of numerous types of vehicle.

In contrast to the known ABS in which the recirculating pump drive 37 is driven at its highest possible speed when the antilock control commences, i.e. at the beginning of the pressure reduction phase introducing an antilock control cycle, there is provided as part of the electronic control unit 53 of the ABS 23 in accordance with the present invention a control stage, designated generally by numeral 58, for a drive control of the drive motor 37 of the recirculating pumps 31 and 32 which brings about a control of the speed of the recirculating pump drive motor 37. Accordingly, in the case of brake-pressure reduction phases of only short duration at one or more of the wheel brakes 11 to 14, the drive motor 37 is operated at only low speed and, with increasing duration of such pressure reduction phases, the drive speed of the pump drive motor 37 is raised increasingly and, if a minimum value of the duration of the pressure reduction phase or phases is reached, the speed of the drive motor 37 is held at a constant maximum value and, thereafter, the speed of the drive motor 37 is reduced constantly or in small steps, until the buffer accumulator 51 and/or 52 are "pumped empty.

Figure 2:
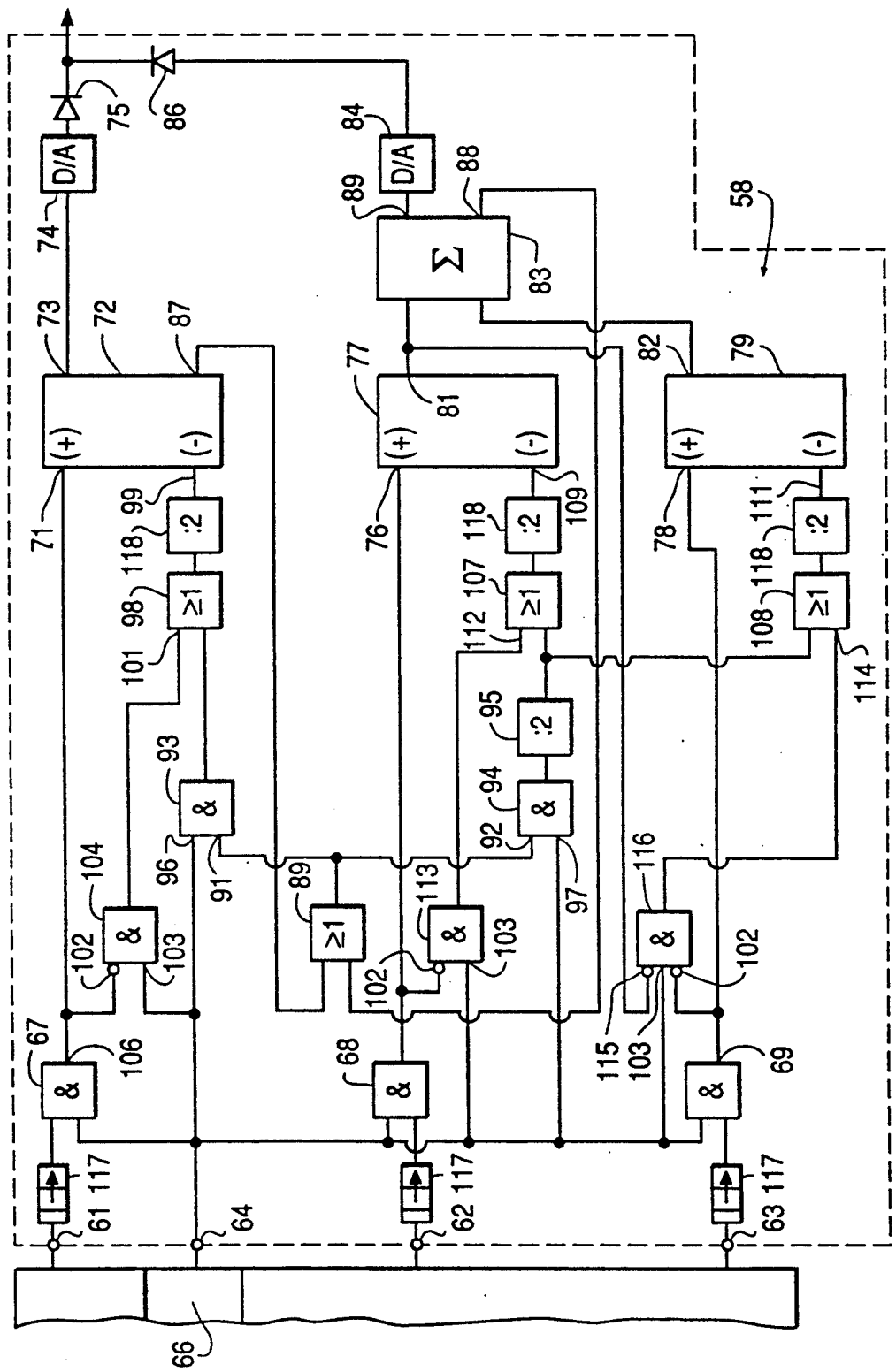
FIG. 2 is a block circuit schematic of an electronic control stage according to the present invention for controlling the build up and reduction of the supply voltage of the electric drive motor of the recirculating pump of the ABS shown in FIG. 1.

FIG. 2, which shows the basic configuration of the control stage 58, will now be used for further explanation.

The control stage 58 is fed, at a first input 61, a direct-voltage signal, which is generated internally by the electronic control unit 53 and is applied as a high-level signal (logical I) if and for as long as the brake-pressure control valve 27 of the rear-axle brake circuit II is controlled into its pressure reduction position II. At a second input 62, the control stage 58 is fed a corresponding voltage signal, which is applied as a high-level signal if and for as long as the brake pressure-control valve 24, which is assigned to the right front-wheel brake 11, is switched into its pressure reduction position II.

The corresponding voltage signal for the case where the brake-pressure control valve 26, assigned to the left front-wheel brake 12, is switched into its pressure reduction position II is fed to the control stage 58 at its third input 63. These signals are referred to hereinafter as "pressure reduction signals".

At a fourth input 64, the control stage 58 is fed the output pulses of a clock generator 66 provided as part of the electronic control unit 53, which pulses are generated as a periodic, high-frequency sequence of high-level and low-level pulses, the high level of which corresponds to that of the pressure reduction signals.

The pressure reductions signals received at the first to third inputs 61 to 63 of the control stage 58 are fed to the one input each of a first 2-input AND element 67, a second 2-input AND element 68 and a third 2-input AND element 69, fed to which at the respectively other input are the clock-generator output pulses received at the fourth input 64 of the control stage 58.

The output signals of these AND elements 67, 68 and 69 are consequently sequences of pulses which are generated in time with the output signals of the clock generator 67 and the number of which is in each case a measure of the duration of pressure reduction phases on the rear-axle brake circuit II as well as of pressure reduction phases at the right front-wheel brake 11 (AND element 68) or the left front-wheel brake 12 (AND element 64). These output signals of the AND elements 67, 68 and 69 are referred to hereinafter as "pressure reduction pulses".

The pressure reduction pulses of the AND element 67, generated for the duration of pressure reduction phases on the rear-axle brake circuit II, are fed to the plus counting input 71 of a first forward/backward counter 72, the counter-reading output signal of which, emitted at a first output 73, is consequently a measure of the charging state of the buffer accumulator 52 assigned to the rear-axle brake circuit II. The counter-reading output signal emitted at the output 73 of the forward-/backward counter 72 is fed to a first digital/analog (D/A) converter 74, which emits a voltage output signal which is proportional to the counter reading of the forward/backward counter 72 and the voltage level of which rises with increasing counter reading. After suitable amplification, this voltage output signal of the first digital/analog converter 74 is fed via a first power diode 75 to the drive motor 37 of the recirculating pumps 31 and 32 as a supply voltage. The drive motor 37 is configured such that its speed rises with increasing supply voltage.

Similarly, the pressure-reduction output pulses of the AND element 68 assigned to the right front-wheel brake are fed to the plus counting input 76 of a second forward/backward counter 77, and the pressure-reduction output pulses of the AND element 69 assigned to the left front-wheel brake 12 are fed to the plus counting input 78 of a third forward/backward counter 79. The counter readings available at the counter outputs 81, 82 of the second forward/backward counter 77 and of the third forward/backward counter 79 are summed by an adder 83 whose output counter reading is consequently a measure of the charging state of the buffer accumulator 51 connected to the return line 41 of the front-axle brake circuit I.

The counter-reading output signal of the adder 83 is converted by a second digital/analog converter 84 into a supply voltage for the drive motor 37 This supply voltage is proportional to the output counter reading of the adder 83, increases with the said reading and is fed to the motor 37 via a second power diode 36.

The drive motor 37 of the recirculating pumps 31, is consequently operated in each case with the higher of the supply voltages generated by the digital/analog (D/A) converters 74, 84.

The first forward/backward counter 72 has a second output 87, at which a voltage output signal of high signal level (logical I) is emitted as soon as the counter reading at the output 73 has reached a predetermined, high counter reading, which corresponds to the completely or greatest-possible charged state of the buffer accumulator 52 connected to the return line 44 of the rear-axle brake circuit II. Similarly, the adder 83 is provided with an output 88, at which a high-level output signal (logical I) is emitted as soon as the counter reading available at the counter reading output 89 of the adder 83 has reached a threshold value, which in turn corresponds to the greatest-possible charging of the buffer accumulator 51 connected to the return line 41 of the front-axle brake circuit I. Also corresponding to these counter-reading threshold values are the highest possible output voltages, for example 12 V, of the two digital/analog (D/A) converters 74, 84, which then no longer increase even if there is an increase in the counter readings available at the outputs 73, 87 of the first forward/backward counter 72 and of the adder 83, respectively. These threshold-value output signals of the first forward/backward counter 72 and of the adder 83 which are emitted at their outputs 87 and 88, respectively, are fed to a first 2-input OR element 89 whose output signals are fed to the one input each 91, 92, respectively, of a first 2-input AND element 93 and a second 2-input AND element 94, fed to which at the respectively other input 96 and 97, respectively, are the output pulses of the clock generator 66.

The output signals of the first AND element 93, fed to which at its one input 96 are the clock-generator output signals, are fed via a second 2-input OR element 98 to the minus counting input 99 of the first forward-/backward counter 72. Fed to the latter at a second input 101 of the second OR element 98 are the output signals of a first 2-input AND element 104, which has negated input 102 and a non-negated input 103. The negated input 102 is connected to the output 106 of the AND element 67 generating the pressure reduction pulses for the first forward/backward counter 72, and the non-negated, second input 103 is fed the output pulses of the clock generator 66.

The output signals of the AND element 94, receiving the output signals of the first 2-input OR element 89 at its one input 92 and the clock-generator output signals at its other input 97, are fed to a dividing stage 95, which has a divider ratio of 1:2 and the output signals of which, emitted at half the frequency of the output signals of the AND element 94, are fed respectively via a third or a fourth 2-input OR element 107 and 108, respectively, to the minus counting input 109 of the second forward/backward counter 77 and the minus counting input 111 of the third forward/backward counter 79. The third 2-input OR element 107, preceding the minus counting input 109 of the second forward-/backward counter 77, receives at its second input 112 the output signals of a second 2-input AND element 113, which has a negated input 102 and a non-negated input 103. The negated input 102 is fed the pressure reduction pulses of the 2-input AND element 68, assigned to the right front-wheel brake 11, and in turn receives at its non-negated input 103 the clock-generator output pulses.

The fourth 2-input OR element 108, preceding the minus counting input 111 of the third forward/backward counter 79, is fed at its second input 114 the output signals of a 3-input AND element 116, which has a negated input 102 and a non-negated input 103 as well as a further negated input 115 and receives at its one negated input 102 the output pulses of the AND element 69, emitting the pressure reduction pulses for the third forward/backward counter 79, receives at its non-negated input 103 the clock-generator output pulses and receives at its further negated input 115 an output signal of the second forward/backward counter 77, assigned to the right front-wheel brake 11. This output signal is applied as a high-level output signal for as long as the counter reading which can be called up at the output 81 of this forward/backward counter 77 is greater than or equal to I.

As soon as brake-pressure reduction phase of the antilock control begins, for example on the rear-axle brake circuit II, the AND element 67, connected to the first input 61 of the control stage 58, emits a sequence of pressure reduction pulses, by which initially the counter reading which can be called up at the output 73 of the first forward/backward counter 72 increases. As a result, with increasing duration of the pressure reduction phase, the output voltage of the first digital/analog (D/A) converter 74 rises and the recirculating-pump drive motor 37 is driven initially slowly and then with increasing speed, whereby the delivery of the, in this situation, alone-effective recirculating pump 32 assigned to the rear-axle brake circuit II also increases. If this pressure reduction phase lasts only for a relatively short time period, so that the buffer accumulator 52 of the rear-axle brake circuit II is charged only partially and the counter readin of the first forward/backward counter 72 does not exceed the threshold value correlated with maximum output voltage of the first digital-/analog converter 74 and consequently also maximum speed of the pump drive motor 37, as soon as the output pulse sequence of the AND element 67 breaks off and therefore the output signal of the latter is a low-level signal, output pulses are emitted at the clock-generator frequency from the first AND element 104, having a negated input 102. These pulses are fed via the second OR element, preceding the minus counting input 99 of the first forward/backward counter 72, to this minus counting input 99. As a result, the counter reading at the output 73 of the first forward/backward counter 72 is successively decremented, and the supply voltage for the pump drive motor 37 correspondingly drops, until the latter finally comes to a standstill and recirculating operation is thereby ended.

If, however, the pressure reduction phase on the rear-axle brake circuit II lasts longer, so that the counter reading at the output 73 of the first forward/backward counter 72 reaches a predetermined threshold value, associated with which are maximum supply output voltage of the first digital/analog converter 74 and driving of the recirculating-pump drive motor 37 at its highest-possible speed, a high-level output signal is emitted at the second output 87 of the first forward-/backward counter 72. With a logical combination of this output signal with the clock-generator output pulses by the first 2-input OR element 89 and the first 2-input AND element 93, the minus counting input 99 of the first forward/backward counter 72 is fed backward-counting pulses synchronously with the pressure reduction pulses also continuing to be emitted from the AND element 67. Consequently, the counter reading at the output 73 of the first forward/backward counter 72 remains constant at the high threshold value, and the recirculating-pump drive motor 37 continues to be driven at highest-possible speed, which also corresponds to highest-possible delivery of the recirculating pumps 31, 32. If the pressure reduction phase dies out, the backward counting of the first forward/backward counter 72 takes place analogously to the situation explained above, in which the threshold value of the counter reading has not been reached, namely in turn by the backward-counting output pulses of the first AND element 104 having a negated input 102.

The function of the control stage 58 when pressure reduction phases occur at the right front-wheel brake 11 and/or the left front-wheel brake 12 is completely analogous to the above description with respect to the actuation of the drive motor 37 of the recirculating pumps 31, 32 for the case of pressure reduction operation on the rear-axle brake circuit II, apart from the difference that the keeping-constant of the output counter readings of the second forward/backward counter 77 and of the third forward/backward counter 79 by generating backward-counting pulses by the AND element 94 is established when the output counter reading of the adder 83 reaches the predetermined threshold value, which signals exhaustion of the buffer accumulator 51, commonly assigned to the front wheel brakes 11 and 12. However, the backward counting of the second forward/backward counter 77, assigned to the right front-wheel brake, and of the third forward/backward counter 79, assigned to the left rear-wheel brake 12, takes place separately by the output signals of the second and third AND element 113 and 116, respectively, with negated input 102. This ensures that, when there are different contributions by the two front-wheel brakes 11, 12 to the charging of the buffer accumulator 51, it is discharged appropriately according to requirements by the recirculating pump 31, i.e. the drive motor 37 of the recirculating pumps 31, 32 is driven for sufficiently long.

In order to make sure that the buffer accumulators 51, 52 are pumped empty following a dying-out of a pressure reduction phase on the front axle brake circuit I and/or on the rear-axle brake circuit II, the measures are suitable alternatively or in combination and are also provided in special configurations of the control stage 58:

1. Drop delay of the pressure reduction signals fed to the AND elements 67, 68 and 69 via the inputs 61, 62 and 63 of the control stage 58 in comparison with those pressure-reduction control signals which are fed to the brake-pressure control valves 24 and/or 26 or 27. By this measure, which can be realized by a simple time-delay element 117, a longer duration of the pressure reduction phase is simulated, which prolongs the operation of the recirculating pumps 31, 32.
2. Interpose dividing stages 108 between the minus inputs 99, 109 and 111 of the forward/backward counters 72, 77 and 79 and the OR elements 98 and 107 as well as 108, preceding them. As a result, the frequency of the backward counting phase is lowered with respect to that of the upward-counting pulses, so that raised output counter readings are obtained. Consequently, the recirculating operation phases of the recirculating pumps are correspondingly prolonged, whereby it is likewise ensured that the low-pressure accumulators 51, 52 are pumped empty at the end of the pressure reduction phases.
3. Briefly actuate the recirculating-pump drive 37 at the beginning of braking, for example controlled by an output of the brake light switch 119.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A control stage for drive control of a recirculation-principle of an antilock braking system recirculating pump unit device for a road vehicle with static brake circuits, the antilock braking system having a brake pressure control valve controlled by a pressure reduction signal of an electronic antilock braking system control unit into a pressure reduction position, for draining brake fluid at a wheel brake subjected to automatic control during a pressure reduction phase through a return line into a low-pressure accumulator, the brake fluid being pumped back by at least one recirculating pump into a main brake line of a respective brake circuit connected thereto and, as a result, a quantity of brake fluid corresponding to the drained quantity is recirculated into a brake booster, a drive motor of the at least one recirculation pump being activated for at least the duration of the pressure reduction phase and being constituted by an electric motor whose speed is proportional to an operating voltage, wherein, from the onset of a pressure reduction signal, the control stage generates the operating voltage for the drive motor which rises with increasing duration of the pressure reduction signal and, after a predetermined rising time, is able to reach a maximum value correlated with maximum speed of the drive motor and then is held at this value at least until the pressure reduction signal dies out, or otherwise rises up to that value which is reached within the pressure-reduction signal duration, and in that the control stage controlling one of a constant and stepwise reduction of the operating voltage of the drive motor, commencing upon dropping of the pressure reduction signal, until standstill of said drive motor, such that the time integral of the operating voltage over the reduction of the operating voltage is equal to or greater than the time integral of the operating voltage over the rising time of the operating voltage.

2. The control stage according to claim 1, wherein for generating the operating voltage fed to the drive motor of the at least one recirculating pump, at least one digital/analog converter converts an output counter reading of a forward/backward counter into a voltage proportional thereto, in that, throughout the duration of the pressure reduction signal, the forward/backward counter is fed at a plus counting input with upward-counting pulses generated at a fixed clock rate, and after dying-out of the pressure reduction signal, a minus counting input of the forward/backward counter is fed with continuously-generated backward-counting pulses which are suppressed for the duration of the pressure reduction signal, the repetition frequency of the backward-counting pulses being at most equal to that of the upward-counting pulses.

3. The control stage according to claim 2, in which the vehicle is provided with at least two wheel brakes which, independently of each other, can be subjected to automatic control and from which brake fluid can be drained via respective brake-pressure control valves each assigned to one of the wheel brakes into the return line and the low-pressure accumulator connected to the return line wherein, with pressure reduction signals generated for the separate pressure reduction control of the brake-pressure control valves, forward/backward counters each assigned to one of the control valves can be actuated, output counter readings of which are summed by a digital adder, whose digital output signal is converted by a digital/analog converter into the operating voltage of the pump drive motor.

4. The control stage according to claim 3, wherein from a counter reading of the adder assigned to the control valves for independent brake pressure control within one of the brake circuits and from a counter reading of a further forward/backward counter assigned to a brake pressure control valve of a second one of the brake circuits with common control of wheel brakes of said second brake circuit with which counter readings a maximum operating voltage for the pump drive motor is associated, a direct voltage signal is generated which is combined in an AND logic operation with output pulses of a clock pulse generator for generating reset pulses for the forward/backward counters, the frequency of the reset pulses fed simultaneously to the forward/backward counters which are assigned to the brake pressure control valves of the wheel brakes being combined in the one brake circuit, being halved by one-half dividing stages with respect to the frequency of the upward-counting pulses fed to the two forward/backward counters assigned to the brake pressure control valves of the wheel brakes combined in the one brake circuit.

5. The control stage according to claim 4, wherein the forward/backward counters whose counter readings are a measure of the durations of the pressure reductions occurring at the separately controllable wheel brakes are successively counted back after said pressure reductions have elapsed.

6. The control stage according to claim 2, wherein at least one AND logic element is operatively arranged with the control stage for generating the upward-counting pulses, which element receives at one of two inputs the pressure reduction signal and at another input high-frequency output pulses of a clock pulse generator, and at least one other AND logic element is operatively associated with the control stage for generating the backward-counting pulses, which second-mentioned and element has at least one negated input, which receives the output signal of the first-mentioned AND element, and a non-negated input, which receives the output pulses of the clock pulse generator.

7. The control stage according to claim 6, wherein a signal, available as direct-voltage signal for at least the duration of pressure reductions and fed to an input of the AND element emitting the upward-counting pulses, is generated as a signal which commences with the pressure reduction signal but is drop-delayed with respect to the pressure reduction signal.

8. The control stage according to claim 2, wherein the frequency of the backward-counting pulses fed to the minus counting input of the forward/backward counter is lower than that of the upward-counting pulses.

9. The control stage according to claim 8, wherein the minus counting input of the forward/backward counter is connected to an output of a dividing stage.

10. The control stage according to claim 1, wherein the rise of the operating voltage and the reduction of the operating voltage take place time-linearly, and the duration of the voltage reduction is greater than the duration of the rise of the operating voltage of the drive motor.

11. The control stage according to claim 1, wherein a supply voltage signal bringing about a brief activation of the recirculating pump drive motor is generated at the initiation of braking.

* * * * *